Oct. 22, 1963　　　H. J. NEARHOOF　　　3,108,212
DUTY-FACTOR CONTROLLED MOTOR
Filed Feb. 29, 1960　　　　　　　　　　　　　3 Sheets-Sheet 1
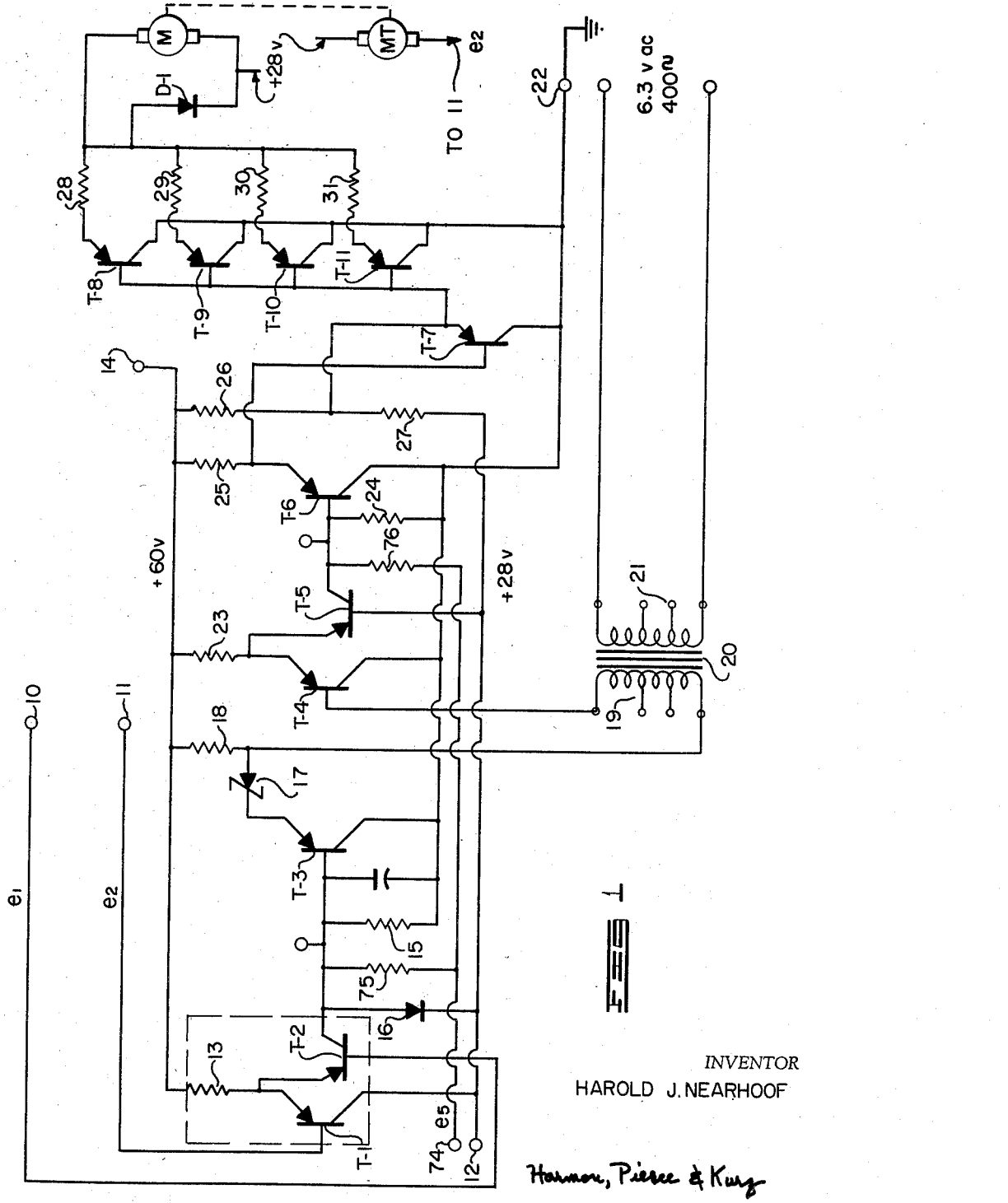
INVENTOR
HAROLD J. NEARHOOF
Harmon, Pierce & Kurz
ATTORNEY

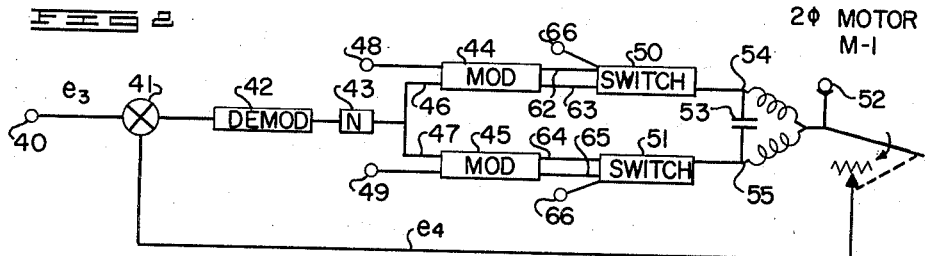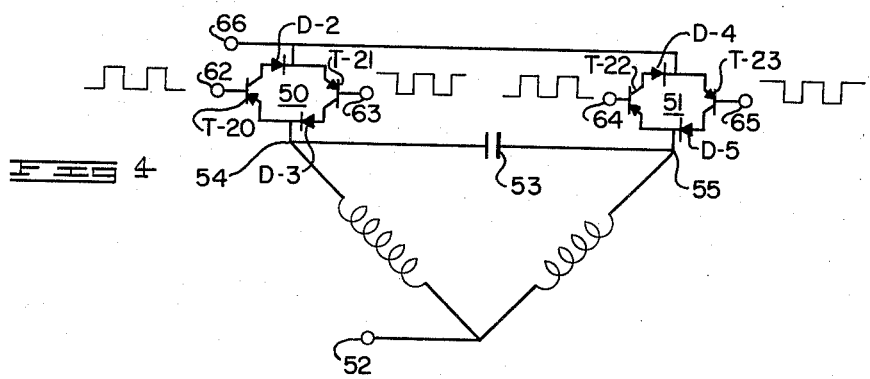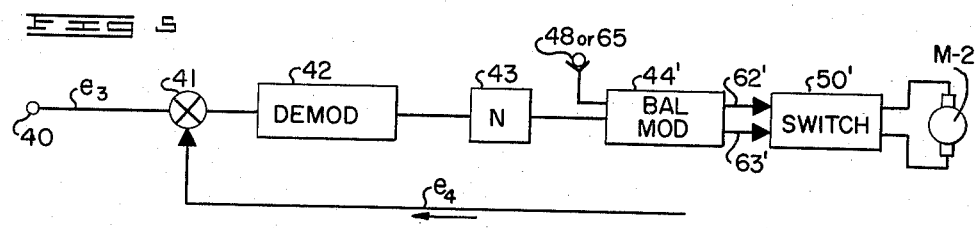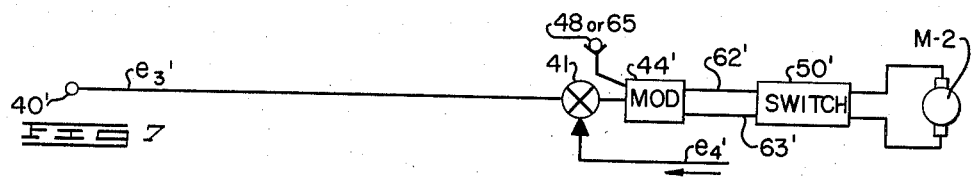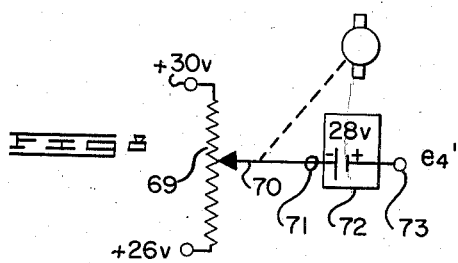
INVENTOR
HAROLD J. NEARHOOF
BY Harmon, Pierce & Kurz
ATTORNEY Oct. 22, 1963 H. J. NEARHOOF 3,108,212
DUTY-FACTOR CONTROLLED MOTOR
Filed Feb. 29, 1960 3 Sheets-Sheet 3

INVENTOR
HAROLD J. NEARHOOF

BY Harmon, Pierce & Kurz
ATTORNEY

United States Patent Office 3,108,212
Patented Oct. 22, 1963

3,108,212
DUTY-FACTOR CONTROLLED MOTOR
Harold J. Nearhoof, State College, Pa., assignor to HRB-Singer, Incorporated, State College, Pa., a corporation of Delaware
Filed Feb. 29, 1960, Ser. No. 11,589
21 Claims. (Cl. 318—28)

This invention relates to motor control systems and more particularly to motor control systems employing electronic control circuits utilizing transistors as control elements. This invention relates to motor control systems having means for comparing either the angular velocity or the position of a servo motor shaft with a variable control voltage which represents servo input data, together with means for varying the speed or position of the servo motor upon the occurrence of voltage differences between voltages representing the velocity or the position of the motor shaft and the controlling data voltage input.

In the several embodiments of the invention described hereinafter, separate control systems are provided in accordance with the particular type of motor and whether the factor under control is the speed or position of such motor.

In the prior art there are many systems for controlling and regulating the speed of an electric motor. One group of motor control systems contemplates motor speed control by varying the period of energization of either the motor armature winding, or the motor field winding(s), or both. Such a control system may be referred to as a pulsed or duty-factor control of the motor speed by effectively varying or controlling the average power input to the motor.

Such duty-factor control of motor speed, as a first particular embodiment of the control system will be referred to hereinafter, may most advantageously be effected by the provision of a motor energizing pulse generator whose output is switched in accordance with speed control data. By varying either the pulse duration or the pulse frequency of the output of such a pulse generator, speed control of the motor is obtained.

One object of my invention is to provide a motor control system employing transistors as control elements. A corollary to this object is the provision of a motor control system having a minimum of circuit complexity, and which will provide a precise and accurate control system utilizing simple and rugged component parts.

An additional object of my invention is to provide a motor control system utilizing transistors as the primary motor energization means wherein the magnitude of the motor current may be very large while the power dissipation of the transistor means is of an exceedingly small value relative to the motor power being controlled.

Another object of my invention is to provide a motor control system having a duty-factor controlled motor by providing a motor energizing pulse generator whose output is switched by means of transistor elements.

Still another object of my invention is to provide a motor control system wherein motor control data indicative of the deviation of the motor speed or position from that of an input reference or control signal is used.

A further object of my invention is to provide a motor control system wherein the speed of the motor is regulated by the provision of a control loop whereby voltage pulses applied to the transistor are used to control the time duration of the variable duty-factor rectangular wave from the pulse generator. The average current, which is a function of the duty-factor, determines the speed of the motor.

Other and further objects, advantages and features of my invention will be understood more clearly from the following detailed description taken in conjunction with the accompanying drawings. In said drawings, which show, for illustrative purposes only, preferred forms of the invention:

FIGURE 1 is a schematic drawing of circuit means for achieving motor speed control, as applied to a D.C. motor;

FIGURE 2 is a schematic block diagram of circuit means for controlling the position of a two-phase A.C. motor;

FIGURES 3 and 4 are schematic drawings of circuit details of certain block components of FIGURE 2;

FIGURE 7 is a schematic block diagram showing a modification of the circuit means of FIGURE 5; and FIGURE 8 is a schematic representation of an error signal generator which may be used as a component of FIGURES 2, 5 and 7.

Figure 5:
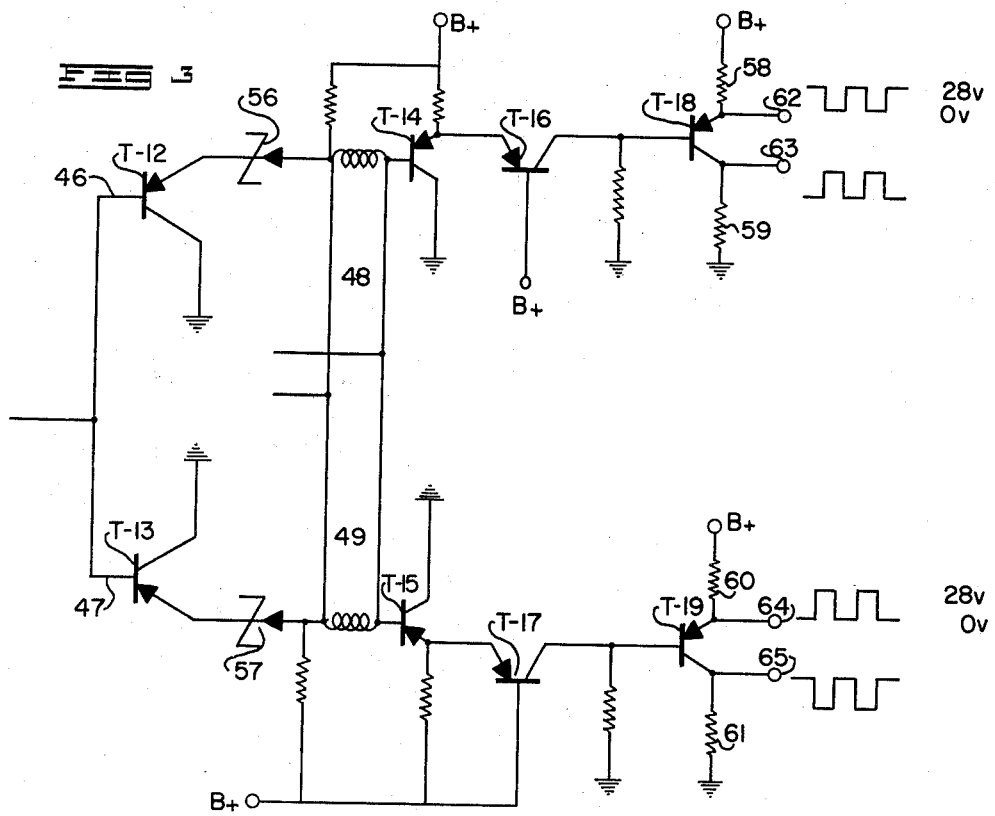
FIGURE 5 is a schematic block diagram of circuit means for controlling the position of D.C. motor.

In accordance with a first embodiment of my invention, a motor energizing pulse generator is provided whose output is switched in accordance with speed control data. The generator output is a variable duty-factor rectangular wave, the average current of which determines the speed of the motor. A difference or error signal is derived as an electrical characteristic which is indicative of the deviation of the speed of a D.C. motor from an input reference or control speed.

With reference now to the embodiment shown in FIGURE 1, there is provided for the energization of the armature of a motor M, a controlled duty-factor pulse source in accordance with this invention. Field energization of motor M may be fixed by means of a separate field winding or by a permanent magnet supply.

Motor M may be of the type known as a servo, which is utilized to regulate the velocity of the driven member in accordance with control data which ordinarily is provided by a loop. In the preferred embodiment of my invention, the motor M may be a scanner drive motor or a velocity servo, and accordingly the input to this servo motor M may be a controlled voltage proportional to the velocity of an aircraft. Of course, in other applications of my invention, the motor M may be a positional servo motor, and in such instances the input to the servo motor M would be a controlled voltage proportional to positional data of the aircraft or other member which is being controlled in position by such servo motor.

In FIGURE 1, the controlled servo motor M is shown at the extreme righthand end of the schematic diagram. The servo input which is proportional to the velocity of the aircraft, and in a specific embodiment may be a controlled voltage proportional to the $V/H$ (velocity altitude) ratio of the aircraft plus a fixed 28 volt reference voltage obtained from the aircraft power supply, which power supply is conventional and not shown, is applied to the input terminal 10. This servo input voltage is further identified by the symbol $e_1$. The servo input voltage is applied to the base element of the error sensing transistor T–2 over a lead which extends from the input terminal 10. A feedback voltage $e_2$ from the motor tachometer MT shown at the righthand portion of FIGURE 1, plus the same fixed 28 volt reference, is connected into the emitter element of T–2 as an output voltage from the emitter element of an isolating emitter-follower circuit of transistor T–1 thus constituting simply a feedback circuit amplifier. The feedback voltage $e_2$ is applied to an input terminal 11 as indicated on the diagram and is connected over a lead extending from the terminal 11 to the base element of transistor T–1.

The collector element of T-1 is returned to a 28 volt bus 12. The emitter element of transistor T-1 receives a control voltage which is developed across a resistor 13 which connects such element to the 60 volt bus 14.

When the tachometer voltage $e_2$ is larger than the input $e_1$ which is proportional to the velocity, transistor T-2 will conduct, but for all other lower values of tachometer voltage such transistor is substantially completely cut off. During conduction, a voltage is developed across the collector load resistor 15 of T-2 in proportion to the amount of its conduction, i.e., in proportion to the amount by which the tachometer feedback exceeds the velocity input, or the voltage $e_2$ exceeds the input voltage $e_1$. Thus transistors T-1 and T-2 form a comparator for the voltages $e_1$ and $e_2$, as shown in broken lines in FIGURE 1. Transistor T-2 is arranged to have a very high gain so as to provide full conduction for small voltage differences $(e_2-e_1)$ as small as the allowable system error.

A limiter diode 16 limits the voltage across resistor 15 to a maximum of 28 volts to protect transistor T-2. The voltage across resistor 15 is emitter-follower coupled through the circuit of transistor T-3 and the bias network of Zener diode 17 and resistor 18 to one side of the secondary winding 19 of a transformer 20. Specifically, the emitter element of transistor T-3 is connected to one end of diode 17, the junction point of diode 17 and resistor 18 is connected to one end of the secondary winding of the transformer, and the free end of bias resistor 18 is connected to the 60 volt bus 14 as shown. The primary winding 21 of transformer 20 is energized from a low voltage, 400 cycle source which is available on the aircraft. This voltage may be, for example, 6.3 volts A.C. The other end of the secondary winding 19 of this transformer, which contains the error signal from load resistor 15; the bias from the network 17, 18; and the 400 cycle signal from the transformer 20; is connected to the base element of an emitter-follower transistor T-4. The collector element of transistor T-4 is returned to the zero voltage or ground bus 22. Output from the emitter element of T-4, which element is biased by means of resistor 23 connected to the 60 volt bus 14, is direct coupled to the input emitter element of the transistor T-5.

As mentioned above, the voltage across load resistor 15 may vary from 0 to 28 volts; the range set by the diode 16. In the bias network 17, 18, the diode 17 is a 14 volt Zener, and therefore such network functions to add approximately 14 volts to this variable voltage to give a D.C. voltage may vary from 14 to 42 volts, spanning 28 volts, equally above and below. The 400 cycle signal added to this as developed across the secondary winding 19 of transformer 20 is exactly 28 volts peak-to-peak. This combined signal is coupled into the emitter element of transistor T-5, and the base element of this transistor is connected directly to the 28 volt bus 12. Therefore, when the combined input to the emitter of T-5 swings above 28 volts, this transistor stage conducts. When the input swings below 28 volts, conduction ceases. The various components of the combined input signal to the emitter element of T-5 are so arranged that over the full 28 volt range of the error voltage taken across load resistor 15, conduction of T-5 will occur at some point on the 400 cycle wave. With zero voltage across load resistor 15, T-5 will conduct only at the positive peaks of the 400 cycle sine wave, and with 28 volts across 15, it will conduct only on the negative 400 cycle sine wave peaks. For any voltage between the limits defined above, the conduction of T-5 will vary according to the amount of the sine wave above the conduction threshold. The duty-cycle of the conduction of transistor T-5 is thus dependent on the error voltage across resistor 15, varying from 0 to 100 percent as the error voltage varies within the range from 28 volts to 0.

The output of the circuit of transistor T-5 is thus the 400 cycle rectangular wave of variable duty-factor and 28 volts peak-to-peak amplitude. This output is taken from the collector element of T-5 and is connected through two cascaded emitter-follower circuits, T-6 and T-7 in order to provide a sufficient current capacity to drive the four-transistor power output stage, T-8, T-9, T-10, T-11. In particular, the output from the emitter of T-5 is directly connected to the base element of T-6. A bias return resistor 24 is connected from the base of T-6 to the ground bus 22, and the collector of T-6 is directly returned to the same ground bus. The emitter of T-6 is biased by means of resistor 25 which is connected to the 60 volt bus 14.

The output from the emitter element of transistor T-6 is directly connected to the base of the emitter-follower stage of transistor T-7. The collector of T-7 is returned directly to ground, and the emitter thereof is returned to a fixed bias point which is the junction of bias resistors 26 and 27. Resistor 26 is connected to the 60 volt bus 14, resistor 27 is connected to the 28 volt bus 12, and their junction point is connected directly to the emitter of T-7. The bias voltage at the emitter may be approximately 30 volts.

By means of the series connection of the emitter-follower stages T-6 and T-7, sufficient current gain is obtained to drive the four parallel-connected power output transistors, T-8 through T-11. These four transistors are operated as an emitter-follower stage with the output from the emitter elements thereof connected to one terminal of the armature of motor M. The other armature terminal is connected to the 28 volt source as indicated. Motor M is thus driven by the 400 cycle variable duty-factor rectangular wave, with the armature voltage being switched from 0 to 28 volts at a 400 cycle rate. The average armature current, which is a function of the duty-factor, determines the motor speed. Resistors 28, 29, 30, and 31, are provided in the emitter output circuits of transistors T-8 through T-11 respectively. Such resistors serve to equalize the current flow through the several transistors and prevent parasitic oscillations.

The power dissipation in the output transistors T-8 through T-11 is of a very small value relative to the motor power being controlled. When the emitters of the four power transistors are at 0 volts, in order to draw a heavy current through motor M, the dissipation is zero. When the emitters are at 28 volts, to balance out or oppose the 28 volts which is applied to the lower armature terminal of the motor, and to thus stop the armature current flow, the dissipation of such emitters is again zero. Maximum emitter dissipation in the ouput power transistors occurs when the voltage and current are halfway between the aforementioned values, where, because of the rectangular wave aspect of the energizing current drive, the switching dwell time is short.

To further reduce the power dissipated in the output transistors T-8 through T-11, a diode D-1 is placed in shunt across motor M to quickly reduce the armature driving current from the transistors to a zero value during the period when the full 28 volts is across the output transistors. That is to say, diode D-1 provides a path of reverse current flow through motor M, permitting a very rapid collapse of the motor winding field when the transistors T-8 through T-11 are rendered nonconducting, and thereby precluding the heavy current flow that would otherwise occur in these transistors at such time.

In the preferred embodiment of FIGURE 1, a method has been described for controlling the speed of a velocity servo or motor M. This method also applies to the control of a motor when it functions as a positional servo and such control may apply to either A.C. or D.C. motors. When the motor is a positional servo, the input signal voltage $e_1$ would be proportional to motor position, and the feedback loop error voltage input $e_2$ would be representative of deviations from the desired motor position as measured by means of a position sensing element rather than a motor tachometer as shown in FIGURE 1.

With reference to FIGURE 2 of the drawings wherein is shown an A.C. system for motor position-control of a two phase servo motor, the A.C. input positional control voltage $e_3$ is applied to terminal 40. An A.C. feedback loop voltage $e_4$ indicative of positional errors of the two phase servo motor M-1, is fed back as one input to the mixing device 41. The second input to mixer 41 is the control signal $e_3$, and the output of such mixer is fed to a demodulator 42. The D.C. output from demodulator 42 may be fed through an optional correction network 43 and the output thereof is a D.C. voltage whose polarity is indicative of the direction of positional deviation, and the magnitude thereof is indicative of the magnitude of such deviation.

The D.C. positional error voltage from the ouput of correction network 43 is fed to a balanced modulator pair 44, 45 over leads 46 and 47 respectively. The duty-factor modulation frequency input, which is chosen to be of a frequency much higher than that of the available 400 cycle reference voltage on the aircraft, is fed as a second input to the modulators 44, 45 over the input leads 48 and 49, respectively. The particular circuit arrangement of a preferred embodiment of modulators 44 and 45, is shown in FIGURE 3, which will be described in detail hereinafter.

The output voltages from modulators 44 and 45 are variable duty-factor rectangular waves having a 180° phase relationship. When the motor is at a null or zero positional error state the positive and negative portions of such voltages are of equal duration. The outputs from modulators 44 and 45 are fed as a first input to a pair of switches 50 and 51, respectively. Specific details of the switch pair 50, 51 are set forth in connection with FIGURE 4, which will be described in greater detail hereinafter. It is sufficient for an understanding of FIGURE 2, at this time, to appreciate that a reference or switching frequency is fed as an additional input over the leads 66 to each of the switches 50 and 51. This reference frequency may conveniently be the 400 cycle voltage available on the aircraft. The 400 cycle reference voltage is also fed as a first input to the common junction point 52 of the two separate phase windings of motor M-1, as indicated in FIGURE 2. Condenser 53 is bridged across the separate input terminals 54, 55 of the two motor phase windings. The input to motor terminals 54 and 55 is supplied from the output of switches 50 and 51, respectively. These switch output wave forms are variable duty-factor rectangular waves whose frequency is that of the reference frequency, and the amplitude of these duty-factor controlled waves is made equal to the peak value of the A.C. wave form which is applied to terminal 52 of the motor M-1. In accordance with well-known principles, the motor M-1 will rotate in one direction or the other as the terminals 54 or 55 are energized by the output of the switches 50 and 51, respectively.

The circuit details of the modulator pair 44, 45 are shown in FIGURE 3. D.C input error signals from the correction network 43 are supplied to the base terminals 46 and 47 of transistors T-12 and T-13 respectively. Transistors T-12 and T-13 are connected as emitter-followers and the collector elements thereof are returned to ground. The output from the emitter elements thereof are fed through the respective Zener limiting devices 56 and 57, respectively, into the balanced modulator pair transistors T-14 and T-15. Such D.C. error control signals are fed to the base elements of T-14 and T-15, and additionally the higher modulation frequency input is supplied to the base element of these transistors over the leads 48 and 49, respectively. The collectors of transistors T-14 and T-15 are grounded and the outputs from the emitter elements thereof are fed to the pair of power transistors T-16 and T-17 respectively. The base elements of T-16 and T-17 are biased from a source of D.C. potential "B+," which may conveniently be the 28 volt source available on the aircraft. The "B+" bias voltage is also supplied to the emitter elements of T-14 and T-15, and the Zener diodes 56 and 57. The output from power transistors T-16 and T-17 is taken from the collector elements thereof and is directly coupled to the base elements of transistors T-18 and T-19, respectively.

Transistors T-18 and T-19 are connected in a phase-splitting arrangement. The input to each of such transistor stages is by means of the base element thereof, and a push-pull pair of rectangular wave output voltages whose frequency is that of the higher modulation frequency, are obtained at the emitter and collector elements thereof, by means of the provision of the well-known use of equal emitter and collector load resistors 58, 59, 60 and 61. The push-pull error voltage from T-18 is fed to switch 50, while the push-pull error voltage from T-19 is fed to switch 51. When the motor M-1 is at a null or zero error position, the outputs from T-18 and T-19 are identical square waves having a 180° phase displacement as indicated in this figure.

The circuit details of the switches 50 and 51 are shown in FIGURE 4. The push-pull error voltage from T-18 is fed to switch 50 by means of leads 62 and 63. Similarly, the push-pull error voltage from T-19 is fed to switch 51 by means of leads 64 and 65. The signals on leads 62 and 63, which are rectangular waves modulated at a frequency much higher than that of the reference 400 cycle frequency, are applied to the base elements of transistors T-20 and T-21 respectively. In addition to these two transistors, switch 50 includes the oppositely-poled diodes D-2 and D-3, as shown in FIGURE 4. The 400 cycle reference voltage is applied at terminal 66, and is also applied at terminal 52 as indicated in FIGURES 2 and 4, which latter terminal is the input to the common junction point of the two separate phase windings of motor M-1. By virtue of the reference voltage applied to terminal 66 and the opposite connections of diodes D-2 and D-3, transistors T-20 and T-21 are made to conduct on alternate half cycles of the reference frequency voltage. The current in each phase may be shown to be equal to $$\frac{2 \times 1.11 \times D.C.}{2}$$

The D.C. current through transistors T-20 and T-21 is controlled by the error voltage from modulator 44. In order to reverse the direction of rotation of motor M-1, switch 51 is actuated by the output from modulator 45 which is applied over terminals 64 and 65 in a manner similar to that previously described in connection with modulator 44 and switch 50. Thus, when the direction of rotation is to be reversed, transistors T-22 and T-23 are made to conduct on alternate half cycles of the 400 cycle reference. The phase current again is equal to the formula:

$$\frac{2 \times 1.11 \times D.C.}{2}$$

The amplitude of the high frequency duty factor controlled square wave which is available to energize the motor phase windings at terminals 54 or 55 is made equal to the peak value of the 400 cycle A.C. wave form.

Figure 6:
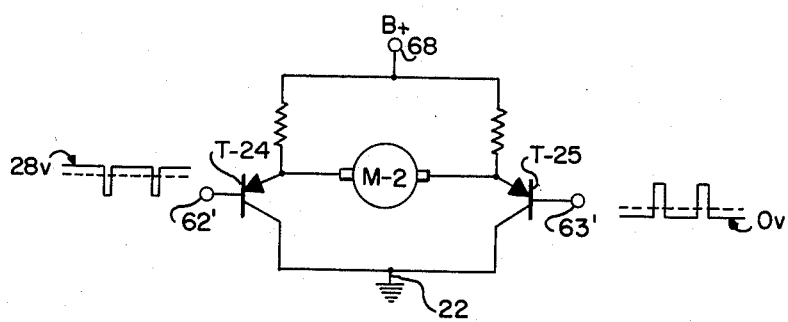
FIGURE 6 is a schematic drawing of circuit details of certain components of FIGURE 5.

FIGURE 6 illustrates a D.C. switch for the control of a D.C. motor M-2 which functions as a positional servo, and it will be noted that such directional control switch circuit involves fewer components than that of the A.C. counterpart of FIGURE 4.

Thus the control circuitry for the A.C. positional servo motor shown in FIGURE 2 reduces to the control circuit of FIGURE 5, wherein like reference numerals have been applied to like elements. An A.C. input positional control voltage $e_3$ is applied to terminal 40. An A.C. feedback loop voltage $e_4$, indicative of positional errors of the D.C. motor M-2, is fed back as one input to the mixing device 41. The second input to mixer 41 is the control signal $e_3$, and the output of such mixer is fed to the demodulator 42. The D.C. output from the demodulator 42 may be fed through an optional correction network 43 and the output thereof is a D.C. voltage whose polarity is indicative of the direction of positional deviation, and the magnitude thereof is indicative of the magnitude of such deviation.

The D.C. positional error voltage from the output of network 43 is fed to a single balanced modulator 44'. This modulator may be identical to modulator 44 shown in FIGURE 3, and the output is indicated by the leads 62' and 63'. By comparison with FIGURE 3, it will be noted that the leads 62' and 63' provide a pair of rectangular wave output voltages whose frequency is that of the modulation frequency, and which bear a phase difference of 180°. When the motor M-2 is at a null or zero error position, the positive and negative wave portions are of equal duration. In the case of positional errors, however, one of the wave portions will be of longer duration and the other will be correspondingly shorter. It will be obvious to those skilled in the art that such a pair of single-ended square wave output voltages would be available directly in FIGURE 3 from the collector elements of the power transistors T-16 and T-17, and thus to an even greater extent, the circuitry of FIGURE 3 may be simplified when controlling a D.C. positional servo motor.

As shown in FIGURE 6, the switch 50' used to control the position of the D.C. servo motor M-2 is also considerably simplified over that of the switches 50 and 51 shown in FIGURES 3 and 4. Transistors T-24 and T-25 replace the switches 50 and 51, and will provide the directional control of the armature of M-2. T-24 and T-25 serve as variable switch elements. Under the control of the rectangular wave voltages from leads 62' and 63', the armature M-2 will be caused to rotate in a first direction or the opposite direction. When the voltages on leads 62' and 63' are equal in duty-factor duration, the motor armature will stand still at a null or zero position, and when the voltages 62' and 63' are unequal in duty-factor duration, as indicated in the figure, the motor will be driven in a direction to correct the positional error. As before, the amplitude of the control voltages 62' and 63', which voltages are applied to the base elements of T-24 and T-25, respectively, must be equal to that of the "B+" to insure that the transistors are completely cut off.

When the input positional control voltage is of a D.C. value, and the feedback loop voltage is also a D.C. value, as represented by the symbols $e'_3$ and $e'_4$ in FIGURE 7, the control circuit is even further simplified. Thus the demodulator stage 42 and the corrective network 43 may be eliminated. In all other respects, the circuit of FIGURE 7 may be identical with that shown for FIGURE 5.

It will be noted that the modulation input terminal for modulator 44' in FIGURE 5, and in FIGURE 7, bears the legend "48 or 65." The numeral 48 corresponds to that of the higher modulation frequency as utilized with modulator 44 of FIGURE 2, however, in further simplification of the control circuits when operating with a D.C. motor, it is possible to utilize the standard 400 cycle voltage available on the aircraft, and the numeral 65 is used to indicate this optional modulation frequency.

The A.C. feedback loop voltage $e_4$, or the D.C. voltage $e'_4$, indicative of positional errors of the motor M-1 of FIGURE 2, and M-2 of FIGURES 5 and 7, may be generated in any well-known manner. FIGURE 8 shows one simplified arrangement for producing the D.C. voltage $e'_4$. In this example, the amplitude of feedback control voltage is arbitrarily chosen to be plus or minus 2 volts D.C., and this is supplied by means of a potentiometer 69 whose arm 70 is positioned by the armature or shaft of the controlled servo motor. A first fixed voltage of plus 30 volts D.C. is applied to the upper end of potentiometer 69, and a second fixed voltage of plus 26 volts D.C. is applied to the lower end thereof. The output from arm 70 will thus be a voltage which varies over four volts centered at 28 volts D.C., and such voltage is applied to input terminal 71 of a fixed source of voltage as indicated by the block element 72. Source 72 is of 28 volts magnitude and has the polarity as indicated, which is in opposition to the polarity available at the tap or arm 70. Thus the output at terminal 73, which is the feedback voltage $e'_4$, will be the difference between the voltage at arm 70 and the fixed opposite potential from the source 72. When arm 70 is in its central position, the voltage $e'_4$ will be zero, when arm 70 is at the top of potentiometer 69, the voltage $e_4$ will be plus 2 volts D.C., and when arm 70 is at its lowest position, $e'_4$ will be minus 2 volts D.C. It is to be understood that the values described for the feedback voltage $e'_4$ in connection with FIGURE 8 are purely arbitrary and have been chosen for illustrative purposes only. In actual circuit practice, the magnitude of $e'_4$ may be considerably less than the plus or minus 2 volts D.C. of this example, and depending upon the value of the control signal $e'_3$, the small voltage difference $(e'_4 - e'_3)$ may be as small as the allowable system error.

It will be obvious to those skilled in the art that the arrangement shown in FIGURE 8 will also serve to produce an A.C. feedback voltage $e_4$, by substituting corresponding A.C. voltages at the ends of potentiometer 69 and in the fixed voltage source 72, and maintaining uniform polarities.

When the motor control system of my invention is incorporated for the control of a servo motor, which motor is part of a complete over-all equipment of an aircraft, the several servo systems must necessarily be referenced to a common electrical voltage supply or level. Thus, if a particular over-all biased reference voltage level is maintained, it will be necessary, in accordance with practice well known in the art, to refer the servo system of my invention to such common reference level. A reference bias level may conveniently be applied to the motor control system in accordance with known practices. For example, in the circuit of FIGURE 1 a reference bias level as indicated by the symbol $e_5$, may be applied to the terminal 74. Such reference bias level is applied to the servo amplifier stages by means of the resistors 75 and 76, and assures that the base of T-3 returns to ground potential during the non-conduction time of T-2. It will be understood that the servo amplifier of FIGURE 1 will function in the manner previously and originally described without the application thereto of the reference bias voltage $e_5$. In a manner similar to that described in connection with FIGURE 1, a reference bias level voltage $e_5$ may be applied to the circuits of FIGURE 3.

It is to be understood that various modifications of the invention other than those above described may be effected by persons skilled in the art without departing from the principle and scope of the invention as defined in the appended claims.

I claim:

1. An electric motor control system for controlling an angular rotational characteristic of a motor shaft comprising, in combination, a motor including a driven shaft and winding means energizable to drive said shaft and to determine an angular rotational characteristic thereof, a controllable source of energy for said motor winding means, unidirectional conducting means connected in shunt relationship with said winding means in such polarity as to provide a low impedance path for reverse current flow through said winding means upon the collapse of the field thereof when said winding means are de-energized and means for controlling said energy source in accordance with a desired angular rotational characteristic of said motor shaft.

2. An electric motor control system for controlling an angular rotational characteristic of a motor shaft comprising, in combination, a motor including a driven shaft and winding means energizable to drive said shaft and to determine an angular rotational characteristic thereof, unidirectional conducting means connected in shunt relationship with said winding means in such polarity as to provide a low impedance path for reverse current flow through said winding means upon the collapse of the field thereof when said winding means are de-energized and means for controlling the average energy input to said motor winding means in accordance with a predetermined angular rotational characteristic of said motor shaft.

3. An electric motor control system for controlling an angular rotational characteristic of a motor shaft comprising, in combination, a motor including a driven shaft and winding means energizable to drive said shaft and to determine an angular rotational characteristic thereof, unidirectional conducting means connected in shunt relationship with said winding means in such polarity as to provide a low impedance path for reverse current flow through said winding means upon the collapse of the field thereof when said winding means are de-energized and means for controlling the average energy input to said motor winding means in accordance with the difference between a predetermined desired and the actual angular rotational characteristic of said motor shaft.

4. An electric motor control system for controlling an angular rotational characteristic of a motor shaft comprising, in combination, a motor including winding means and a rotatable shaft whose angular rotational velocity is dependent upon the energization of said winding means, unidirectional conducting means connected in shunt relationship with said winding means in such polarity as to provide a low impedance path for reverse current flow through said winding means upon the collapse of the field thereof when said winding means are de-energized, a source of rectangular pulse wave energy for energizing said motor winding means, and means to vary the duty-factor of the pulses from said source as a function of a desired angular rotational characteristic of said motor shaft.

5. An electric motor control system for controlling the angular position of the shaft of a two-phase motor comprising, in combination, a first source of control energy representative of the desired shaft position, a second source of control energy representative of the actual shaft position, a source of duty-factor modulatable rectangular wave energy, switch means to apply said rectangular wave energy in phase opposition to the two individual motor phase windings, and means to modulate the duty-factor of said rectangular wave energy in accordance with differences between said control energies.

6. An electric motor control system for controlling the angular position of the shaft of a two terminal motor comprising, in combination, a motor including two terminals and a shaft, a first source of control energy representative of the desired shaft position, a second source of control energy representative of the actual shaft position, a source of rectangular wave energy of variable duty-factor, switch means to apply said rectangular wave energy in phase opposition to said two motor terminals, and means to vary the duty-factor of said rectangular wave energy in accordance with differences between said control energies.

7. An electric motor control system for controlling the angular position of the shaft of a two terminal motor comprising, in combination, a motor including two terminals and a driven shaft, a first source of control energy representative of the desired shaft position, a second source of control energy representative of the actual shaft position, a source of rectangular waves of variable energy content, switch means to apply said rectangular waves in phase opposition to said two motor terminals, and means to vary the energy content of said rectangular waves in accordance with differences between said control energies.

8. An electric motor control system for controlling the angular velocity of the shaft of a motor comprising, in combination, a motor including driving winding means and a driven shaft, a first source of control energy representative of the desired shaft velocity, a second source of control energy representative of the actual shaft velocity, a source of rectangular wave energy of variable duty-factor, switch means to apply said rectangular wave energy to said motor winding means, unidirectional conducting means connected in shunt relationship with said winding means in such polarity as to provide a low impedance path for reverse current flow through said winding means upon the collapse of the field thereof when said winding means are de-energized and means to vary the duty-factor of said rectangular wave energy in accordance with differences between said control energies.

9. An electric motor control system for controlling the angular velocity of the shaft of a motor comprising, in combination, a motor including driving winding means and a driven shaft, a first source of control energy representative of the desired shaft velocity, a second source of control energy representative of the actual shaft velocity, a source of rectangular waves of variable energy content, switch means to apply said rectangular waves to said motor winding means, unidirectional conducting means connected in shunt relationship with said winding means in such polarity at to provide a low impedance path for reverse current flow through said winding means upon the collapse of the field thereof when said winding means are de-energized and means to vary the energy content of said rectangular waves in accordance with differences between said control energies.

10. In an electric motor control system for controlling the angular rotational characteristic of a motor shaft in accordance with the average energy input to the motor, a source of rectangular wave input energy for said motor, unidirectional conducting means for said motor to provide a low impedance path for reverse current flow through said motor upon the collapse of the field thereof when said motor is de-energized and means to variably apply the cyclic energy content of said source to said motor as a function of a desired rotational characteristic of said shaft.

11. An electrical motor control system for controlling the angular rotational characteristic of a motor shaft in accordance with the total energy input to the motor comprising, in combination, a first motor energizing source of predetermined voltage magnitude, a cyclic motor energizing source of rectangular waves of at least said predetermined voltage magnitude, means to vary the duty-factor of said rectangular waves as a function of a rotational characteristic of said shaft, means to apply said first and said cyclic energizing sources in opposition to said motor, and unidirectional conducting means connected in shunt relationship with said motor in such polarity as to provide a low impedance path for reverse current flow through said motor upon the collapse of the field thereof when said motor is de-energized.

12. In an electric motor control system for controlling the angular rotational characteristic of a motor shaft in accordance with the average energy input to the motor, a source of rectangular wave input energy for said motor, and means including a transistor duty-factor modulator circuit to variably apply the cyclic energy content of said source to said motor as a function of a desired rotational characteristic of said shaft.

13. An electrical motor control system for controlling the angular rotational characteristic of a motor shaft in accordance with the total energy input to a motor comprising, in combination, a first motor energizing source of predetermined voltage magnitude, a cyclic motor energizing source of rectangular waves of at least said predetermined voltage magnitude, means including a transistor modulator to vary the duty-factor of said rectangular waves as a function of a rotational characteristic of said shaft, and means to apply said first and second cyclic energizing sources in opposition to said motor.

14. An electric motor shaft speed control system including, in combination, a source of control voltage proportional to the desired shaft speed, means to provide a controllable rectangular wave, a motor whose shaft rotational speed is determined by the average current input thereto, transistor switch means coupling the output of said rectangular wave providing means to the input of said motor, unidirectional coupling means connected in shunt relationship with said motor in such polarity as to provide a low impedance path for reverse current flow through said motor upon the collapse of the field thereof when said motor is de-energized, and means to vary the duty-factor of the output of said rectangular wave as a function of said control voltage.

15. An electric motor control system for controlling an angular rotational characteristic of a motor shaft comprising, a motor having a shaft, the angular rotational characteristics of said shaft being determined by the average current input to said motor, an error signal generator driven by said motor shaft whose output is a first electrical quantity the magnitude of which is proportional to the rotational characteristic of said shaft, a variable source of a second electrical quantity whose output magnitude is controllable in accordance with the desired rotational characteristic of said motor shaft, means to generate a rectangular pulse wave of constant peak-to-peak voltage amplitude, means to vary the duty factor of said rectangular wave in accordance with the difference between said first and second electrical quantities, and means to couple said wave to the input of said motor.

16. The electric motor control system of claim 15 wherein a unidirectional conducting means is connected in shunt relationship with said motor in such polarity as to provide a low impedance path for reverse current flow through said motor upon the collapse of the field thereof when said motor is de-energized.

17. The motor control system of claim 15 wherein said means to couple said rectangular wave to the input of said motor constitutes a transistorized switching means.

18. An electric motor control system for controlling an angular rotational characteristic of a motor shaft comprising, in combination, a motor having a shaft, the rotational characteristics of said shaft being determined by the average current input to said motor, an error signal generator driven by said motor shaft whose output is a first electrical quantity, the magnitude of which is proportional to the rotational characteristics of said shaft, a variable source of a second electrical quantity whose output magnitude is controllable in accordance with the desired rotational characteristics of said motor shaft, comparator means for receiving said first and second electrical quantities and providing an error signal output in accordance with the difference therebetween, an A.C. reference voltage source, means connected to receive said A.C. reference voltage and said error signal, said means operating to produce an output rectangular wave having a variable duty factor which is controlled in accordance with the magnitude of said error signal, and switch means connected to couple said rectangular wave to the input of said electric motor.

19. The electric motor control system of claim 18 wherein a unidirectional conducting means is connected in shunt relationship with said motor in such polarity as to provide a low impedance path for reverse current flow through said motor upon the collapse of the field thereof when said motor is deenergized.

20. The electric motor control system of claim 19 wherein said first electrical quantity provided by said error signal generator is proportional to the rotational position of said motor shaft while said second electrical quantity is representative of the desired motor shaft position.

21. An electric motor control system for controlling an angular rotational characteristic of the shaft of a two terminal motor comprising, in combination, a first source of control energy representative of the actual position of said motor shaft, a variable source of a second electrical control energy whose output magnitude is controllable in accordance with the desired position of said motor shaft, comparator means to receive the output signals from said first source of control energy and said second variable source, said comparator means operating to provide a D.C. error signal in accordance with the difference between said signals from said first and second sources, modulator means connected to receive said error signal, said modulator means operating to provide a plurality of output rectangular waves, the phase relationship between said waves being determined by the magnitude of said error signal, and switch means to apply said rectangular waves in phase opposition to said two motor terminals thereby instituting the angular position control of said motor.

References Cited in the file of this patent
UNITED STATES PATENTS

| | | |
|---|---|---|
| 1,495,947 | Boddie | May 27, 1924 |
| 1,966,077 | Nyman | July 10, 1934 |
| 1,972,689 | Meyer | Sept. 4, 1934 |
| 2,115,086 | Riggs | Apr. 26, 1938 |
| 2,426,508 | Isserstedt | Aug. 26, 1947 |
| 2,786,174 | Askew | Mar. 19, 1957 |
| 2,887,642 | Ehret et al. | May 19, 1959 |
| 2,905,876 | Hillman | Sept. 22, 1959 |
| 2,921,247 | Morrison | Jan. 12, 1960 |
| 2,985,808 | Ketchledge | May 23, 1961 |
| 3,004,199 | Sakson | Oct. 10, 1961 |

OTHER REFERENCES

IRE Dictionary, page 47, definitions of Duty Cycle and Duty Factor; published by IRE, New York, 1961.

Cockrell, W. D.: Industrial Electronic Control, 2nd ed., McGraw-Hill, New York, 1950, p. 295, FIG. 21–17.